Figure 1:
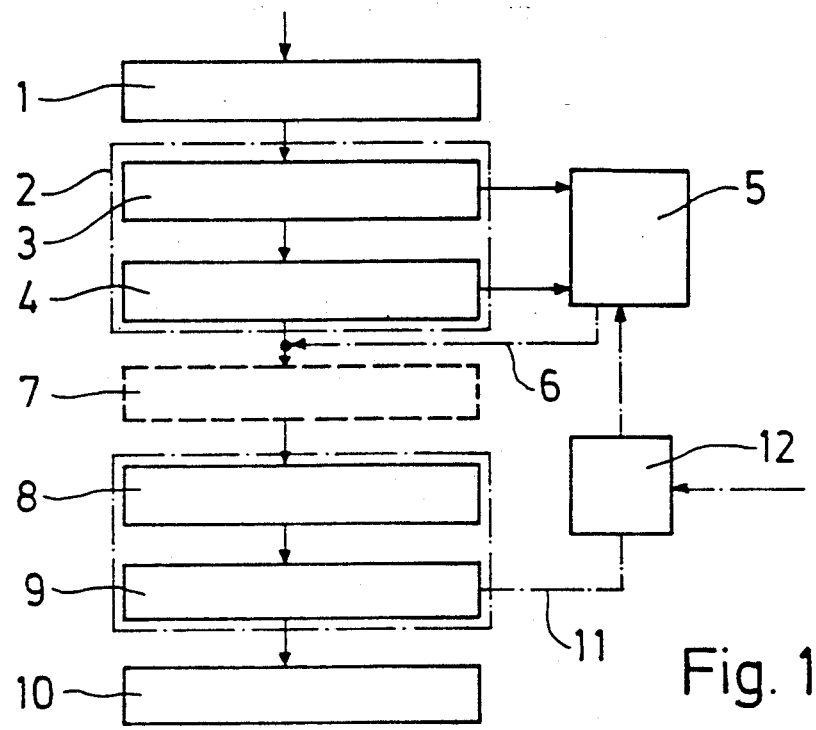

United States Patent [19]
Gresch

[11] Patent Number: 5,110,472
[45] Date of Patent: May 5, 1992

[54] PROCESS FOR TREATMENT OF FRUITS AND VEGETABLES, ESPECIALLY FOR JUICE EXTRACTION, AND UNIT FOR CARRYING OUT THE PROCESS

[75] Inventor: Walter Gresch, Niederweningen, Switzerland

[73] Assignee: Bucher-Guyer AG Maschinenfabrik, Niederweningen, Switzerland

[21] Appl. No.: 610,768

[22] Filed: Nov. 8, 1990

Related U.S. Application Data

[63] Continuation of Ser. No. 186,481, Jun. 15, 1988, abandoned.

[30] Foreign Application Priority Data

Aug. 19, 1986 [CH] Switzerland .................. 3306/86

[51] Int. Cl.⁵ .......................................... B01D 61/18
[52] U.S. Cl. ..................... 210/632; 210/641; 210/651; 210/259
[58] Field of Search ............ 210/641, 651, 632, 259, 210/257.2; 426/238, 516, 518, 519, 489, 599

[56] References Cited

U.S. PATENT DOCUMENTS

| | | | |
|---|---|---|---|
| 3,892,877 | 7/1975 | Wagner et al. | 426/599 X |
| 4,331,692 | 5/1982 | Drevici et al. | 426/635 X |

FOREIGN PATENT DOCUMENTS 8203568 10/1982 Int'l Pat. Institute .............. 210/641

Primary Examiner—Frank Spear
Attorney, Agent, or Firm—Edmund M. Jaskiewicz

[57] ABSTRACT

For extraction of juice from fruits and vegetables a process is used in which first the raw material is crushed in a crushing device (1) and separated in a screening device (2) from the solid components, then liquefied by physical cell breakdown, and the raw juice is clarified in a filtration device (9). In this connection, device (8, 27, 32) for the physical cell breakdown can be integrated into filtration device (9) or into filtration module (13) of a membrane filtration device.

33 Claims, 3 Drawing Sheets

PROCESS FOR TREATMENT OF FRUITS AND VEGETABLES, ESPECIALLY FOR JUICE EXTRACTION, AND UNIT FOR CARRYING OUT THE PROCESS

This is a continuation of application Ser. No. 186,481, filed Jun. 15, 1988, now abandoned.

The invention relates to a process for treatment of fruits and vegetables, especially for juice extraction, and a unit for carrying out the process, with devices for preparation of the raw material by crushing, cell breakdown and filtration.

It is already known by Japanese specification No. 59-35580 to treat mash in a container with enzymatic cell breakdown. The crushed fruits are mixed together with the added enzymes, e.g., cellulase, pectinase, with the help of an agitator and liquefied by enzymatic cell breakdown. The resulting liquid mixture runs through a pulping machine and is passed on to a sterilizing device for deactivation of the enzymes. Then the raw juice is fed to an ultrafiltration device and clarified.

The disadvantage of this process consists in the fact that taste changes occur in the juice by the cell breakdown with the help of enzymes. For this reason most legislatures also forbid enzymatic cell breakdown so as not to endanger the natural substance of the juice. In addition, by the use of relatively expensive enzymes the operating costs of the unit are very high. Further, relatively large tank volume is necessary for the enzymatic liquefaction, which requires much space.

Another known process of the initially mentioned type also uses enzymes for the liquefaction of the mash. Separation of seeds, peels and stems takes place only after liquefaction. Because these inferior quality components remain for a considerable time in the fruit pulp, a negative effect is produced on the taste of the juice, which is also intensified by the action of the enzymes.

Therefore the object of the invention is to provide a process and corresponding unit which avoid said disadvantages and contribute to the improvement of quality and reduction of cost in juice extraction.

According to the invention this object is achieved by the raw material first being crushed and separated from the solid components, then totally or partially liquefied by physical cell breakdown and the raw juice being clarified subsequently or simultaneously with the cell pulp.

The clarification of the raw juice suitably takes place by membrane filtration, preferably ultrafiltration or microfiltration. In difficult cases a two-state filtration is advisable. In this case, for the first state a coarse filtration or microfiltration, which is flowed against tangentially, is used, which operates at higher pressures, e.g., over 20 bars. The permeate of the first stage is fed to a second stage (less than 10 bars), which suitably consists of a normal ultrafiltration or microfiltration.

According to an essential feature of the invention the raw material can consist of whole fruits.

The unit for carrying out the process is distinguished by the fact that it consists of a crushing device, e.g., a mill for crushing the raw material, a screening device for separating stems, seeds and peel parts, etc., downstream from the crushing device or integrated into it, a subsequent device for physical cell breakdown and a filtration device.

But instead of a mill, the whole fruit can be crushed after passage through a blanching machine, in a pulping machine, which at the same time is used as a screening device.

For a more efficient use of the raw material and for an improvement of the yield a recycling press, by which juice is removed from the separated stems, seeds and parts of peels, etc., is allocated to the screening device.

To increase the yield of the unit and for disposal of the retentate accumulating from the filtration device, the retentate can also be fed to the recycling press. The arrangement of the recycling press makes it possible, in the case of high overall yield, to run the membrane filtration unit in the case of only moderate yield, which results in great cost savings.

To avoid postclouding of the juice, especially by colloidally dissolved parts, macromolecules, e.g., polyphenols, and to improve the filtration capability of the retentate there is provided between the filtration device and the recycling press a pretreatment stage in which the retentate is treated with known fining agents and generally small amounts of enzymes before it is fed to the recycling press.

For simple further processing the raw juice recovered by the recycling press is fed back into the process course by a feed pipe immediately after the screening device.

To reduce the viscosity of the crushed raw material and thus to improve the filtration performance and in addition, depending on the breakdown process, also to accelerate the physical cell breakdown, a treatment stage with pectolytic enzymes allowed in practice can be provided between the screening device and a device for physical cell breakdown. The enzymatic treatment is also possible after the physical cell breakdown, if only an improvement of the filtration performance is intended. In difficult cases, in addition to the physical cell breakdown an enzymatic cell breakdown by addition of cellulase enzymes supporting the physical pulping is also possible here.

According to another process feature of the invention the physical cell breakdown takes place by the mechanical action on the cells of high shearing forces, impact and collision, alternating pressure and release, ultra-sound and cavitation.

In a preferred embodiment of the invention the device for physical cell breakdown consists of a high-pressure homogenizer and/or a colloid mill.

The effect of the physical cell breakdown can be improved by the nozzle of the pressure homogenizer consisting of one or more successively placed processing chambers for the raw material, downstream from which a diffuser is connected for energy recovery.

In another embodiment of the invention the device for physical cell breakdown can consist of an electric alternating field unit.

An advantageous process feature of the invention is characterized in that the electric alternating field unit is connected upstream from the mechanically operating cell breakdown device to increase the effect of the physical cell breakdown even more.

According to another advantageous feature of the invention the device for physical cell breakdown is integrated into the filtration device.

Preferably the device for physical cell breakdown in one or more of the existing circuits of the filtration device is placed in series or parallel to it.

In the case of a membrane filtration device operating by batch or semibatch the device for physical cell breakdown is placed in a circuit, which consists of a tank a feed pipe and a return pipe. In this case the device is paced in this circuit after the feed pump. But it can also be placed in the circulating circuit of ultrafiltration or microfiltration device before or after a circulating pump. Because of the great flow in the case of the arrangement in the circulating pipe a circuit parallel to the circulating pipe is advisable.

In the case of membrane filtration devices operating completely continuously and in several stages because of the great flow in the first stage a device for the physical cell breakdown at least in the first stage is also connected parallel in the circuit of this stage.

A particularly advantageous combination of physical cell breakdown and membrane filtration is achieved by the electric alternating field unit being integrated into a filtration module of the filtration device preferably made as an utrafiltration or microfiltration device. In this case the one electrode of the electric alternating field unit is placed on the retentate side and the second electrode or other electrodes with a common electric connection is/are placed on the permeate side of filtration module. The filtration module can be designed as a pipe module or plate module.

If a filtration module designed as a pipe module is used, according to an advantageous feature of the invention an inner electrode is placed in a membrane filter pipe of the pipe module and a second electrode is formed by an externally insulated outer jacket pipe of the pipe module.

According to another feature of the invention the device for the physical cell breakdown is integrated into the circulating pump or feed pump of the membrane filtration device. For this purpose, a gear ring, with edges and spaces which work together with stationary counteredges of a stator solidly connected to the pump casing, is placed on the periphery of a rotating impeller of the circulating pump adjacent to the pump bade and bring about the cell breakdown.

The advantages achieved with the invention consist especially in the fact that by the physical cell breakdown the changes in taste occurring in the usual process as a result of the use of cell breakdown enzymes are avoided and the juice quality is substantially improved. The relatively high costs for the consumption of enzymes can be saved and the yield can be improved. Moreover, there is a reduction of the tank volume in comparison with the enzymatic cell breakdown. Consequently, the holding time is reduced, which brings with it an additional improvement in the quality of the juice. All of this results in lower operating costs with a favorable price/performance ratio of the overall unit. By the integration according to the invention of the device for the physical cell breakdown into the membrane filtration device existing circuits can be used to simplify and reduce the cost of the cell breakdown. Energy expenditure is reduced, because the cell breakdown is not necessary in one passage and thus, for example, the pressure homogenizer can be operated with lower pressure. Further, the size of the unit and thus the space requirements are reduced.

Figure 2:
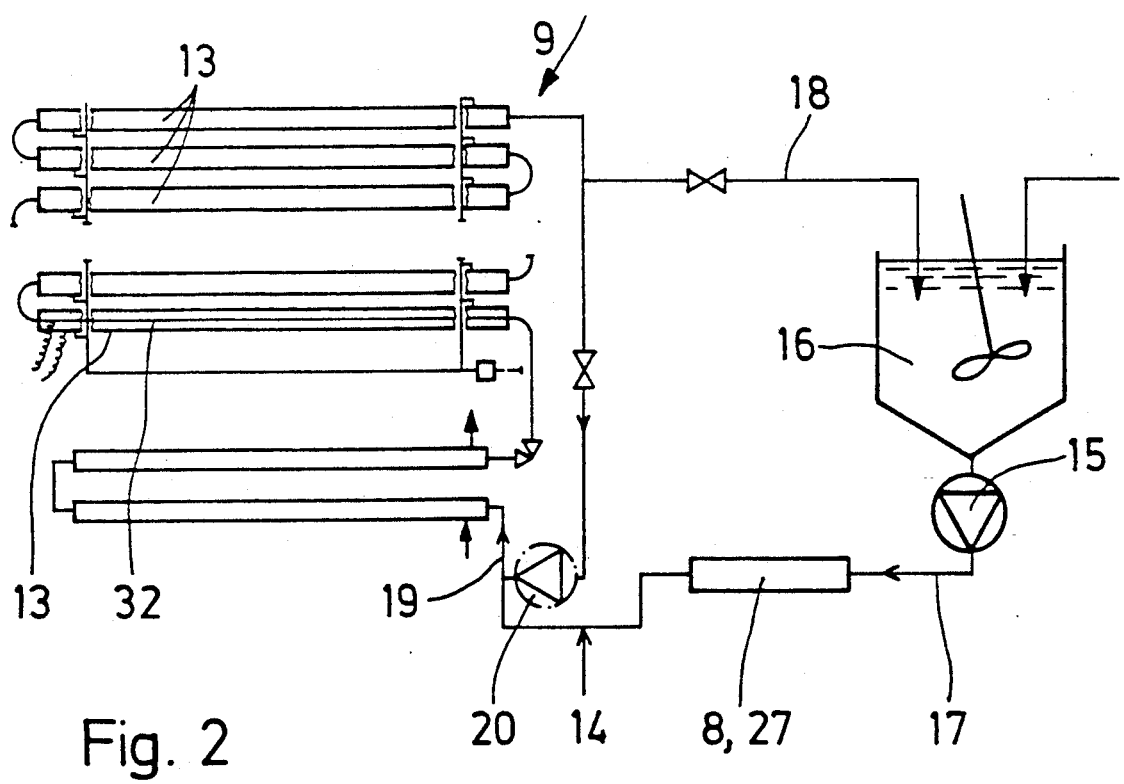
Figure 3:
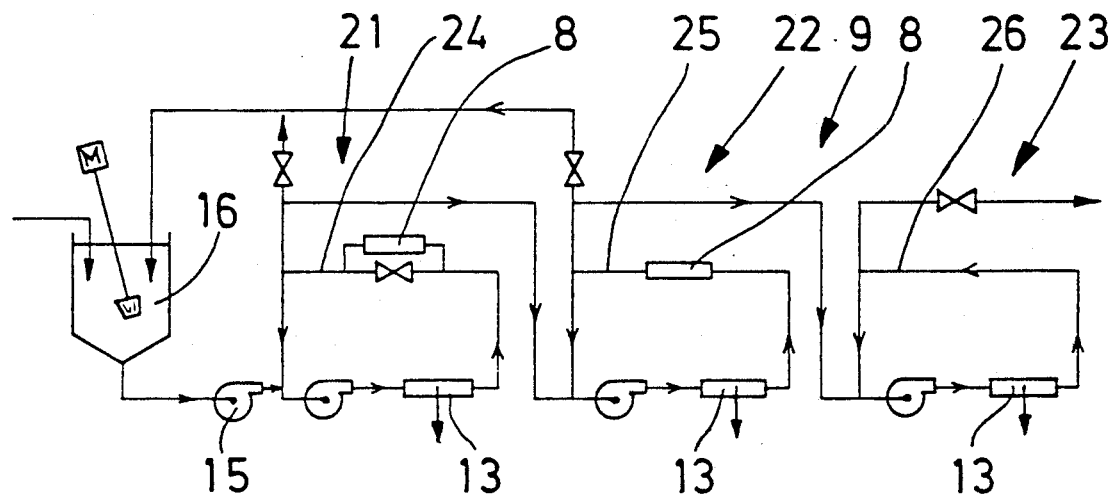
Figure 4:
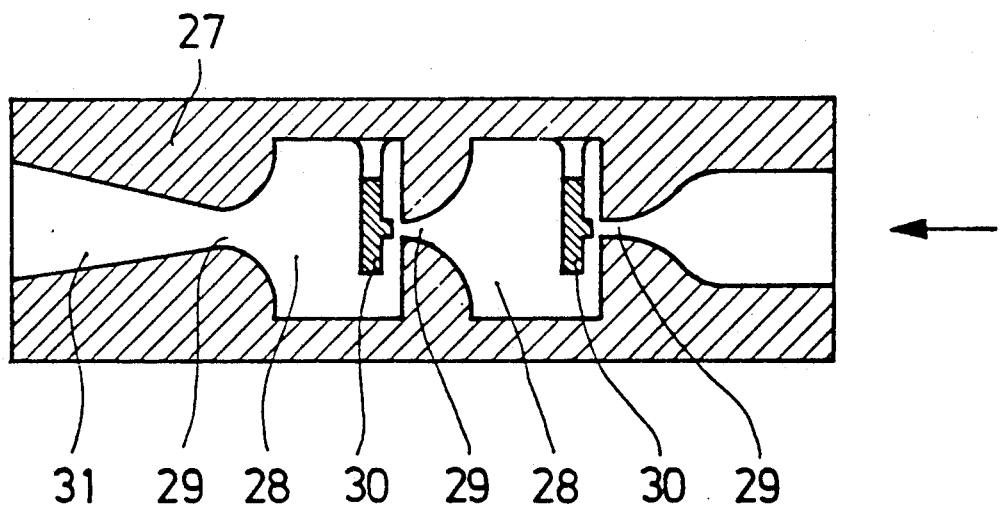
Figure 5:
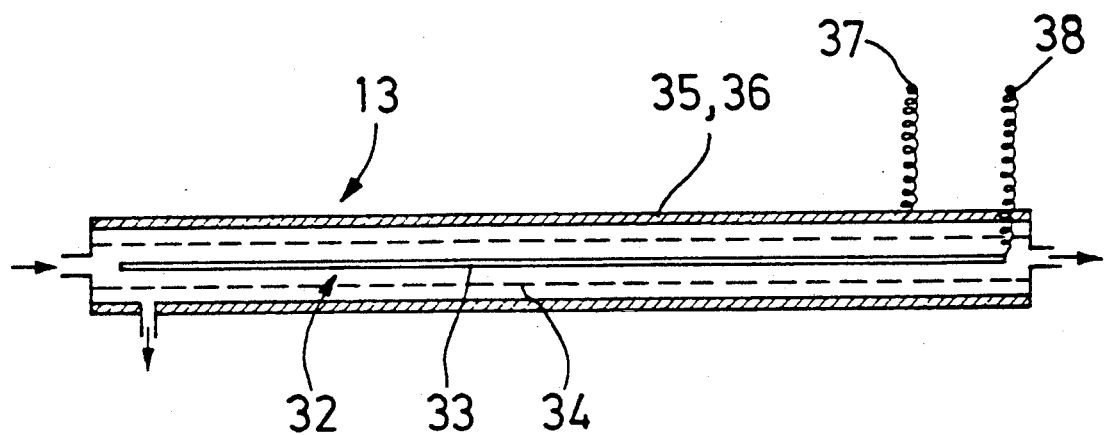
Figure 6:
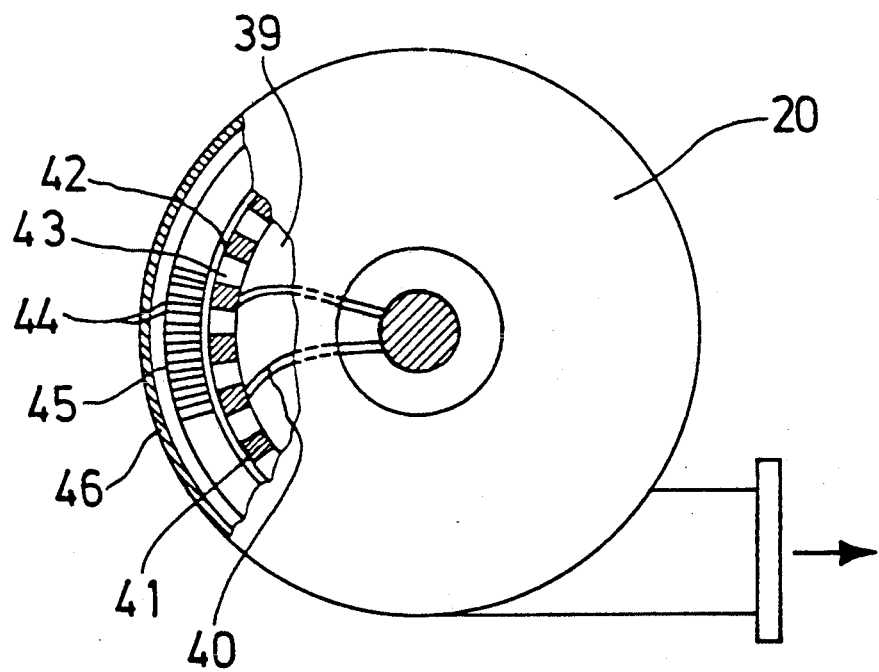

The invention is explained in greater detail in the following description and drawing which represents several embodiments. There are shown in:

FIG. 1, a diagrammatic representation of the overall unit,

FIG. 2, an embodiment for integration of the device for the physical cell breakdown in a membrane filtration device operating by batch or semibatch, FIG. 3, another embodiment for integration of the device for physical cell breakdown in a multistage membrane filtration device operating completely continuously, FIG. 4, an embodiment of a nozzle optimized for physical cell breakdown, FIG. 5, an embodiment of a device for physical cell breakdown integrated into a pipe module and FIG. 6, another embodiment of a device for physical cell breakdown integrated into the circulating pump of the membrane filtration device.

An embodiment of the unit according to the invention for carrying out the process is represented diagrammatically in FIG. 1. The raw material to be dejuiced, which can consist of whole fruit, is crushed in a mill 1 and fed to a screening device 2. Screening device 2 consists of a first coarse sieve drum 3 and a second fine sieve drum 4. The solid components, such as stems, seeds, parts of peels and the like are separated from the crushed raw material by screening device 2 and fed to recycling press 5 allocated to screening device 2. A horizontal press is best suited as a recycling press because of the good filtration action by the long flow path for the juice. In contrast with conventional juice removal processes here relatively small presses are sufficient. The raw juice recovered by recycling press 5 is fed back into the process course by a pipe 6 immediately after screening device 2. The residue accumulating in recycling press 5 is removed for another use.

From screening device 2 the crushed and screened raw material reaches a treatment state 7, in which the raw material is exposed to an enzyming for pectin decomposition. Said enzyming causes a reduction of the viscosity and thus an improvement of the filtration performance and, in addition, also an acceleration of the physical cell breakdown, which is performed in a device 8 following treatment state 7. Device 8 consists of a high-pressure homogenizer, which is equipped with a special nozzle of known type for mechanical cell breakdown. The raw material coming from treatment stage 7 in this case under high pressure flows through the nozzle of the high-pressure homogenizer and is largely crushed by the action of cavitation and shearing forces and liquefied by the resulting physical cell breakdown.

The raw juice produced by device 8 is then fed to a filtration device 9 and clarified. Filtration device 9 preferably consists of a membrane or ultrafiltration or microfiltration device. The resulting permeate arrives in the usual was for concentrating and bottling in an appropriate unit 10. The retentate is fed to recycling press 5 by pipe 11 for further use, but beforehand runs through a pretreatment stage 12. Known fining agents, such as gelatin, are used in this case as pretreatment agents. Consequently, certain macromolecules or colloidally dissolved parts, which result in postclouding or cannot pass through membrane filtration, are removed from the system. Moreover, the filtration capability of the retentate can be improved by the use of enzymes in pretreatment stage 12, e.g., cellulase enzymes for cell breakdown still not broken down. In contrast with known processes for enzymatic cell breakdown, only small amounts of cellulase are needed relative to the overall process. In addition, there is the possibility, if the quality does not meet requirements, to direct this juice to a special use. But the quality of the juice of the recycling juice can also be improved if the enzyme in the retentate is deactivated after enzyming, e.g., by pasteurizing. In this way the enzyme is kept from acting on the stems, seeds, parts of peels, etc. in recycling press 5 and thus from causing negative taste changes.

If the clarified juice is further concentrated, the juice yield can even be increased with the help of known extraction devices to recycling press 5. Further, in most cases a so-called Dia-filtration therefore is unnecessary in the case of membrane filtration, which improves the average filtration performance.

In FIG. 2 an embodiment of the invention is represented in which filtration device 9 is designed as a membrane or ultrafiltration or microfiltration device with several filtration modules 13 operating by batch or semibatch. In this embodiment a device 8 for physical cell breakdown is completely integrated into the overall unit of filtration device 9. Device 8 in this case is paced in a circuit 14 after a feed pump 15. Circuit 14 is formed by a tank 16, a feed pipe 17 and a return pipe 18. But device 8 can also be placed in a circulating circuit 19 before or after a circulating pump 20.

FIG. 3 shows another embodiment, in which filtration device 9 is designed as a multistage membrane or ultrafiltration or microfiltration device operating completely continuously. This embodiment exhibits three filtration stages 21, 22 and 23 with circuits 24, 25 and 26, in which filtration modules 13 are placed. Feed pump 15 is combined with a device for physical cell breakdown according to FIG. 6. The mash is pretreated in a relatively small tank 16, connected upstream from the filtration unit, by means, e.g., of a shearing turbine. For improvement of the physical cell breakdown a retentate partial stream is fed back from the first two filtration stages 21, 22 into tank 16 via a return pipe. In circuit 24 of first filtration stage 21 a device 8 for physical cell breakdown is placed parallel to circuit 24.

As a result, the relatively large flow accumulating in the first filtration stage is reduced. In second filtration stage 22, in which the flow is no longer so great, device 8 for physical cell breakdown is no longer parallel but in series in circuit 25.

In the membrane filtration process the ratio of the circulating amount within the ultrafiltration or microfiltration device to the feed amount is generally very high. The relatively large circulating amount is necessary to guarantee a smooth functioning of the ultrafiltration or microfiltration device. If a cell breakdown device is installed in one of the circuits or parallel to it, as shown in FIG. 2 and 3, substantially less breakdown per passage is necessary. For this reason, less powerful and thus simpler devices operating more cost effectively and with less energy can be used, without additionally increased operating costs occurring for increased circulation.

In FIG. 4 an embodiment is represented of device 8 for physical cell breakdown in the form of a nozzle 27 of a pressure homogenizer optimized for this purpose. Nozzle 27 consists of two successively placed processing chambers 27 for the raw material. At the beginning and end of processing chambers 28 the passage cross section of nozzle 27 is reduced to a nozzle mouth 29. In processing chambers 28 in the area of each nozzle mouth 29 is placed a baffleplate 30, against which the raw material strikes at high speed and is crushed and broken down by processing chamber 28 nozzle mouth 29 widens into a diffuser 31, by which to save energy the kinetic energy is converted into pressure adapted to the circuit. Use of this nozzle is especially suitable for incorporation in a circuit of the filtration membrane unit.

An electric alternating field unit of known design can be used as another device for physical cell breakdown. Such a unit consists, for example, of two concentric electrodes, a ring electrode and a cylinder electrode. An annular clearance, through which the raw material is fed, is formed between the two electrodes. To the two electrodes is applied an alternating voltage to whose action the raw material is subjected to a physical cell breakdown in an electric alternating field. Within the unit according to the invention this device is well suited for pretreatment of the raw material before the main breakdown in device 8. Therefore in the embodiment the electric alternating field unit can be installed upstream from the high-pressure homogenizer.

Both dynamic, e.g., colloid mill, and statically operating units, as, for example, nozzle 27 according to FIG. 4, are suitable as devices for physical cell breakdown integrated into the membrane filtration unit. By the use of such nozzles it is possible to work with substantially lower pressures, which also results in lower investment costs. By the nozzle shape used according to FIG. 4 the speed-energy is partially recovered through diffuser 31 in the form of pressure-energy. Consequently, the energy consumption for cell breakdown is further reduced.

From FIG. 2 ie can be gathered that in this embodiment filtration modules 13 of the membrane or ultrafiltration or microfiltration device consist of pipe modules. In this case an electric alternating field unit 32 for physical cell breakdown is integrated into first filtration module 13, as represented in greater detail in FIG. 5. An inner electrode 33 of electric alternating field unit 32 is inside a membrane filtration pipe 34, through the retentate is conducted. An outer jacket pipe 35 for removal of the permeate forms second electrode 36, which is insulated toward the outside. An alternating voltage, which causes a physical cell breakdown of the material to be processed, is applied between the two electrodes 33 and 36 by electric connections 37 and 38. Several successively or parallel connected filtration modules 13 with integrated alternating field unit 32 can also be used. In this case, filtration modules 13 with integrated electric alternating field unit 32 in addition to nozzle 27 placed in circuit 14 can be used, as shown in the embodiment according to FIG. 2.

Instead of the tubular filtration module 13 according to FIG. 5 other modules can also be used, as, e.g., plate modules, in which the inner electrode is placed between the membrane filter plates and the second electrode is formed by the housing, which is insulated toward the outside.

Another embodiment of an integrated device for physical cell breakdown is shown in FIG. 6. Circulating pump 20 or feed pump 15, placed in the circuit of the membrane filtration device, exhibits a gear ring 41 with edges 42 and spaces 43 on the periphery of rotating impeller 39 adjacent to blades 40 by which the raw juice is brought through by the pumping action of blades 40. Edges 42 rotating with impeller 39 work with stationary counteredges 44 of a stator 45, which is solidly connected to pump casing 46. Very high shearing and friction forces, which act on the raw juice and cause the desired cell breakdown, are produced in the relatively small gap between gear ring 41 and stator 45.

Use of the membrane filtration unit with integrated cell breakdown according to the invention, especially also the filtration module with integrated electric alternating field unit and the circulating pump with integrated cell breakdown device is not limited to the process according to the invention. These devices can be advantageously used wherever a physical cell breakdown with subsequent filtration is to be performed, for example, also in the field of biotechnology.

I claim:

1. Process for the preparation of fruits and vegetables as raw materials for the extraction of juice therefrom comprising the steps of crushing the raw material and separating out solid components from the crushed raw material, subjecting the crushed raw material from which solid components have been separated to mechanical or electrical treatment, so as to apply mechanical shearing forces to result in a breakdown of the cells thereof to produce an at least partially liquefied raw juice, and subjecting the raw juice to filtration to clarify the raw juice to form a permeate.

2. Process according to claim 1 wherein clarification of the raw juice takes place by membrane filtration.

3. Process according to claim 2, wherein clarification of the raw juice takes place by ultrafiltration or microfiltration.

4. Process according to claim 2, wherein filtration takes place in two stages, and the first stage is designed as a high-pressure stage and the second stage as a normal pressure stage.

5. Process according to claim 4, wherein the first filtration stage takes place by a coarse filtration or a microfiltration device, flowed against tangentially, and the second filtration stage takes place by an ultrafiltration or microfiltration device.

6. Process according to claim 5, wherein the raw material consists of whole fruit.

7. Process according to claim 1, wherein the cell breakdown optionally takes place by the mechanical action on the cells of high shearing forces, impact and collision, alternating pressure and release, ultrasound, cavitation and electric alternating fields.

8. Unit according to claim 7, wherein device (8) for cell breakdown consists of a high-pressure homogenizer and/or a colloid mill.

9. Device for cell breakdown, according to claim 8, wherein nozzle (27) of the pressure homogenizer consists of one or more successively placed processing chambers (28) downstream from which a diffuser (31) is connected.

10. Process for cell breakdown, according to claim 7, wherein the electric alternating field unit is connected upstream from the mechanically operating cell breakdown device.

11. An apparatus for the treatment of fruits and vegetables as raw material by crushing, cell breakdown and filtration for the extraction of juice therefrom, comprising means for the crushing of raw materials comprising fruits and vegetables, a screening device downstream from said crushing means to receive the crushed raw material and to separate out solid components comprising stems, seeds and portions of peels, means downstream of said screening device to receive the crushed raw materials from which solid components have been separated, for applying mechanical or electrical treatment, which generates mechanical shearing forces upon the crushed raw materials to break down the cells of the raw material so as to form a raw juice, and a filtration device to receive the raw juice from said cell breakdown means to clarify the raw juice.

12. Unit according to claim 11, wherein filtration device (9) consists of an ultra-filtration or microfiltration device.

13. Unit according to claim 11 wherein a recycling press (5) for removal of juice from the separated stems, seeds and parts of peels, etc. is connected to said screening device (2).

14. Unit according to claim 13 wherein the raw juice recovered by recycling press (5) is recycled immediately after screening device (2) into the course of the process by a feed pipe (6).

15. Unit according to claim 11 wherein the retentate accumulating from filtration device (9) is fed to recycling press (5).

16. Unit according to claim 5, wherein a pretreatment stage (12) in which the retentate is treated with fining agents and enzymes before it is fed to recycling press (5) is placed between filtration device (9) and recycling press (5).

17. Unit according to claim 11, wherein a treatment stage (7) with pectolytic enzymes is provided between screening device (2) and a device (8) for cell breakdown.

18. Unit according to claim 17, wherein treatment stage (7) is provided after device (8).

19. Unit according to claim 11, wherein device (8) for the cell breakdown consists of an electric alternating field unit (32).

20. Unit for the treatment of fruits and vegetables, especially according to claim 11, wherein device (8) for cell breakdown is integrated into filtration device (9).

21. Unit according to claim 20, wherein integrated device (8) is placed in one of the existing circuits of filtration device (9) in series or parallel to it.

22. Unit according to claim 21, wherein device (8) is placed in circuit (14) of a membrane filtration device operating by batch or semibatch, which consists of a tank (16), a feed pipe (17) and a return pipe (18).

23. Unit according to claim 21 or 22, wherein device (8) is placed in circuit (14) after a feed pump (15).

24. Unit according to claim 21, wherein device (8) for cell breakdown is connected parallel in circuit (24) at least in first stage (21) of a membrane filtration device operating completely continuously and in several stages.

25. Unit according to claim 20 wherein device (8) is placed in a circulating circuit (19) of filtration device (9) before or after a circulating pump (20).

26. Device, especially for the unit according to claim 25, wherein the device for the cell breakdown is integrated into circulating pump (20) and/or feed pump (15) of the membrane filtration device.

27. Device according to claim 26, wherein a gear ring (41) with edges (42) and spaces (43), which work together with stationary counteredges (44) of a stator solidly connected to pump casing (46), is placed on the periphery of a rotating impeller (39) of circulating pump (20) and/or feed pump (15) adjacent to blades (40).

28. Unit according to claim 20 wherein a device (16) for pretreatment of the mash pulp is connected upstream from the filtration device or devices.

29. Unit according to claim 28, wherein at least a partial stream of the retentate from one or more of the filtration stages of a continuous filtration unit is fed by a return pipe (32) into pretreatment device (16).

30. Device, especially for the unit according to claim 20, wherein electric alternating fluid unit (32) is integrated into a filtration module (13) of filtration device (9).

31. Device according to claim 30, wherein the one electrode of electric alternating field unit (32) is placed on the retentate side and the second electrode or other electrodes with a common electric connection is/are placed on the permeate side of filtration module (13).

32. Device according to claim 30 or 31, wherein filtration module (13) is designed as a pipe module or plate module.

33. Device according to claim 32, wherein an inner electrode (33) is placed in membrane filter pipe (34) of filtration module (13) designed as a pipe module and second electrode (36) is formed by externally insulated outer jacket pipe (35) of filtration module (13).

* * * * *